(12) United States Patent
Kandula et al.

(10) Patent No.: US 9,983,578 B2
(45) Date of Patent: May 29, 2018

(54) REMOTE OPERATOR STATION FOR A MACHINE

(71) Applicant: Caterpillar Inc., Peoria, IL (US)

(72) Inventors: Suneel Venkata Kandula, Melbourne (AU); Shane Arthur May, Burnie (AU); Brent Russell Harrison, Chillicothe, IL (US); Mihai Lazaroiu, Peoria, IL (US); Greg Scott Reiner, Princeville, IL (US); Garrett Frank McCowan, Normal, IL (US)

(73) Assignee: Caterpillar Inc., Deerfield, IL (US)

( * ) Notice: Subject to any disclaimer, the term of this patent is extended or adjusted under 35 U.S.C. 154(b) by 3 days.

(21) Appl. No.: 15/134,005

(22) Filed: Apr. 20, 2016

(65) Prior Publication Data

US 2017/0308074 A1    Oct. 26, 2017

(51) Int. Cl.
| | |
|---|---|
| *G05D 1/00* | (2006.01) |
| *E02F 9/00* | (2006.01) |
| *H04W 4/00* | (2018.01) |
| *B60N 2/38* | (2006.01) |
| *B60N 2/46* | (2006.01) |
| *E02F 9/20* | (2006.01) |

(52) U.S. Cl.
CPC ............ *G05D 1/0016* (2013.01); *B60N 2/38* (2013.01); *B60N 2/468* (2013.01); *E02F 9/2004* (2013.01); *E02F 9/205* (2013.01); *G05D 1/0038* (2013.01); *H04W 4/005* (2013.01)

(58) Field of Classification Search
CPC ...... G01D 1/00; G01D 1/0016; G01D 1/0038; B60N 2/00; B60N 2/38; B60N 2/468; E02F 1/00; G05D 1/00
See application file for complete search history.

(56) References Cited

U.S. PATENT DOCUMENTS

| | | | | |
|---|---|---|---|---|
| 6,450,284 B1 * | 9/2002 | Sakyo | ....................... | E02F 9/16 180/329 |
| 6,629,572 B2 * | 10/2003 | Womer | ................... | E21B 44/00 175/219 |
| 6,633,800 B1 * | 10/2003 | Ward | .................... | B60W 50/02 180/167 |
| 7,243,982 B2 * | 7/2007 | Kelley | .................... | E02F 9/163 296/190.08 |
| 8,272,467 B1 * | 9/2012 | Staab | ........................ | E02F 9/26 172/2 |
| 8,646,826 B2 * | 2/2014 | Wihinen | ................ | B60K 35/00 180/89.12 |

(Continued)

*Primary Examiner* — Yonel Beaulieu
(74) *Attorney, Agent, or Firm* — Miller, Matthias & Hull (57) ABSTRACT

A remote operator station may include a seat. A first and a second input device may be disposed on the seat. An interface device may be discretely arranged with respect to the remote operator station and may include an interface processor in communication with a machine. The interface processor may be configured to remotely control non-movement features and function of the machine. An electronic control module may be in communication with, at least, the first and second input devices. The electronic control module may be configured to: receive input signals from one of the first and second input devices; process the input signals; and communicate wirelessly processed input signals to a machine for remote operation thereof.

20 Claims, 6 Drawing Sheets

(56) References Cited

U.S. PATENT DOCUMENTS

| | | | |
|---|---|---|---|
| 8,985,263 B2 * | 3/2015 | Peterson | E21F 13/025 180/317 |
| 9,057,221 B2 * | 6/2015 | Warr | E21B 7/02 |
| 2002/0117017 A1 * | 8/2002 | Bernhardt | G05G 9/047 74/471 XY |
| 2003/0230447 A1 * | 12/2003 | Wulfert | B60N 2/143 180/329 |
| 2007/0203630 A1 * | 8/2007 | Vitale | B60K 28/04 701/50 |
| 2008/0180272 A1 * | 7/2008 | Scherer | A63H 30/04 340/13.24 |
| 2009/0163283 A1 * | 6/2009 | Childress | A63F 13/08 463/47 |
| 2014/0365031 A1 | 12/2014 | Harrison | |

* cited by examiner

REMOTE OPERATOR STATION FOR A MACHINE

TECHNICAL FIELD

The present disclosure relates generally to remote operator stations for a machine and, more particularly, relates to a remote operator station for remotely operating a machine and which provides a simulated environment similar to a real time operation of such a machine.

BACKGROUND

Many machines used in the earth-moving, construction, mining, and agricultural industries operate in challenging environments. For example, some mining machines operate in underground mines where the environment may be more challenging due to low tunnel clearances and ground stability concerns surrounding the immediate area. In recent efforts to improve safety at such worksite environments, trends have been to reduce the number of on-site operators at these worksites by implementing autonomous machines that are remotely controlled from a remote operator station (ROS).

With such machines employed at the physical worksite, the ROS may be positioned at a safer location at or near the worksite or may be positioned remotely from the worksite. For example, the ROS may be positioned indoors in an office environment. To fit the needs and requirements of a particular office environment, some ROS may be customized with a lot of variability. While effective, the non-standardization involved with customization of certain components for use with the ROS may lead to inefficiency in initial custom installation at an office site, difficulty in maintenance and serviceability, and complications in familiarity with interface controls for an operator.

U.S. Pat. No. 9,213,333 (the '333 patent) discloses a remote operator station. The remote operator station of the '333 patent includes a modular mounting structure including a frame. While effective, the remote operator station of the '333 patent merely provides a mounting structure that allows for easy transportation and assembly without removing component variability.

SUMMARY

In accordance with an aspect of the disclosure, a remote operator station is provided. The remote operator station may include a frame. The frame may include a support section, an elevated section, and a base disposed between the support section and the elevated section. A seat may be coupled to the elevated section and may include a first armrest and a second armrest. A first input device may be disposed integrally with the first armrest and a second input device may be disposed integrally with the second armrest. An upright support mast may be detachably coupled to the support section and a first interface device may be coupled to the upright support mast. The first interface device may include a first interface processor. A first swing arm may be detachably coupled to the support section and a second interface device may be coupled to the first swing arm. The second interface device may include a second interface processor. An enclosure may be disposed underneath the elevated section. A router may include a router processor and may be housed in the enclosure. The router may be in communication with the first interface device and the second interface device. An electronic control module may be in communication with, at least, the first and the second input devices and the router. The electronic control module may be housed in the enclosure and may be configured to: receive input signals from one of the first input device and the second input device; process the input signals; and communicate wirelessly processed input signals to a machine for remote operation thereof.

In accordance with another aspect of the disclosure, a remote operator station is provided. The remote operator station may include a seat. A first and a second input device may be disposed on the seat. An interface device may be discretely arranged with respect to the frame and may include an interface processor in communication with a machine. The interface processor may be configured to remotely control non-movement features and function of the machine. An electronic control module may be in communication with, at least, the first input device and the second input device. The electronic control module may be configured to: receive input signals from one of the first input device and the second input device; process the input signals; and communicate wirelessly processed input signals to a machine for remote operation thereof.

In accordance with yet another aspect of the disclosure, a system is provided. The system may include a remote operator station remotely located from a machine. The machine may include an implement and a plurality of cameras. The remote operator station may include: a frame; a seat slidably coupled to the frame, the seat may include a first armrest and a second armrest; a first input device disposed integrally with the first armrest; a second input device disposed integrally with the second armrest; a first interface device coupled to the frame, the first interface device may include a first interface processor in communication with the machine and the plurality of cameras, the first interface processor may be configured to receive and display real-time situational awareness features of the machine; a second interface device coupled to the frame, the second interface device may include a second interface processor in communication with the machine, the second interface processor may be configured to remotely control non-movement features and functions of the machine; an electronic control module in communication with, at least, the first input device, the second input device, and the machine, the electronic control module configured to: receive input signals from one of the first input device and the second input device; process the input signals; communicate wirelessly processed signals to the machine for remote operation of the machine and the implement.

These and other aspects and features of the present disclosure will be more readily understood upon reading the following detailed description when taken in conjunction with the accompanying drawings.

DETAILED DESCRIPTION

Figure 1:
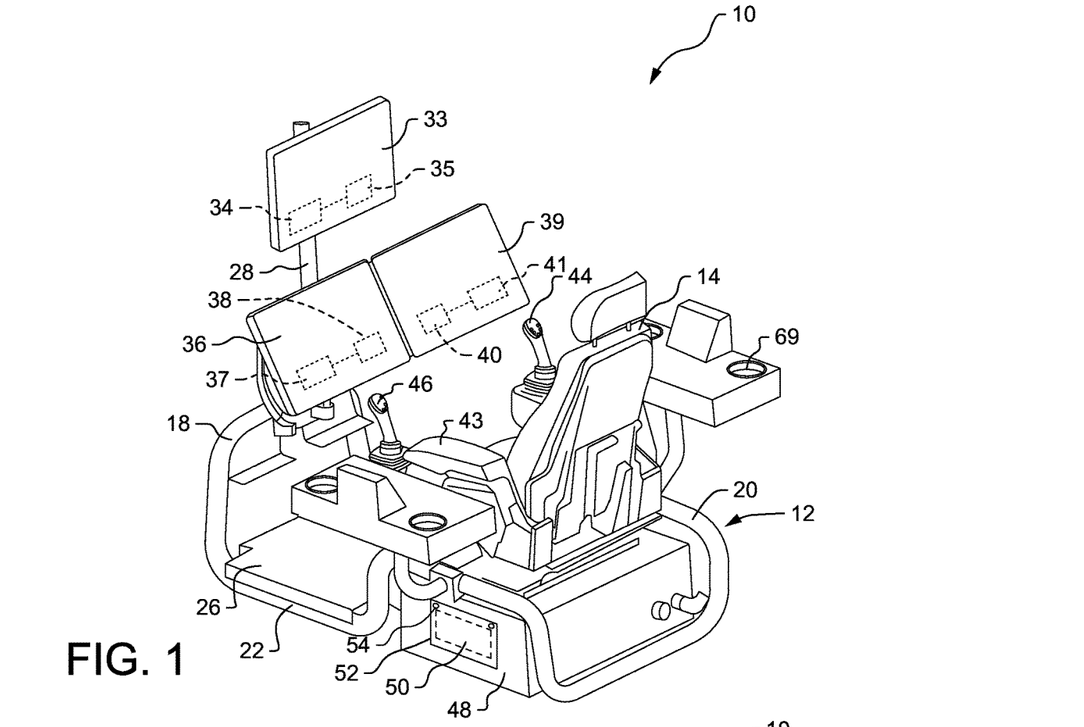
FIG. 1 is a perspective view of an exemplary remote operator station, in accordance with an embodiment of the present disclosure.
Figure 2:
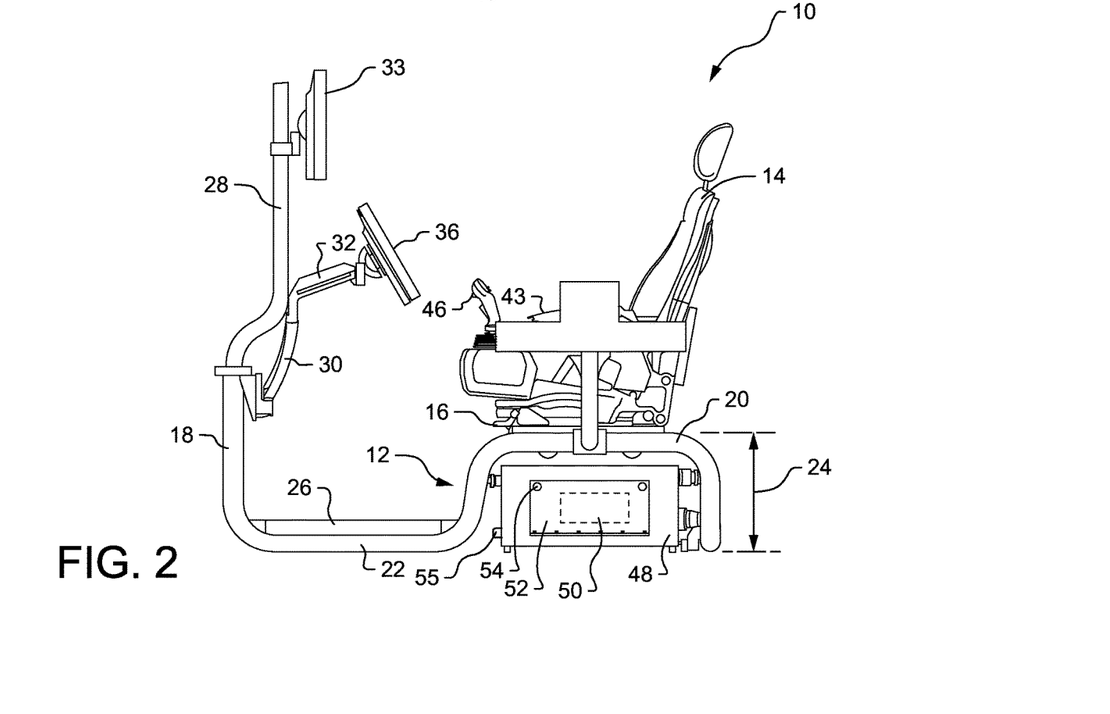
FIG. 2 is a side view of the exemplary remote operator station of FIG. 1, in accordance with an embodiment of the present disclosure.
Figure 3:
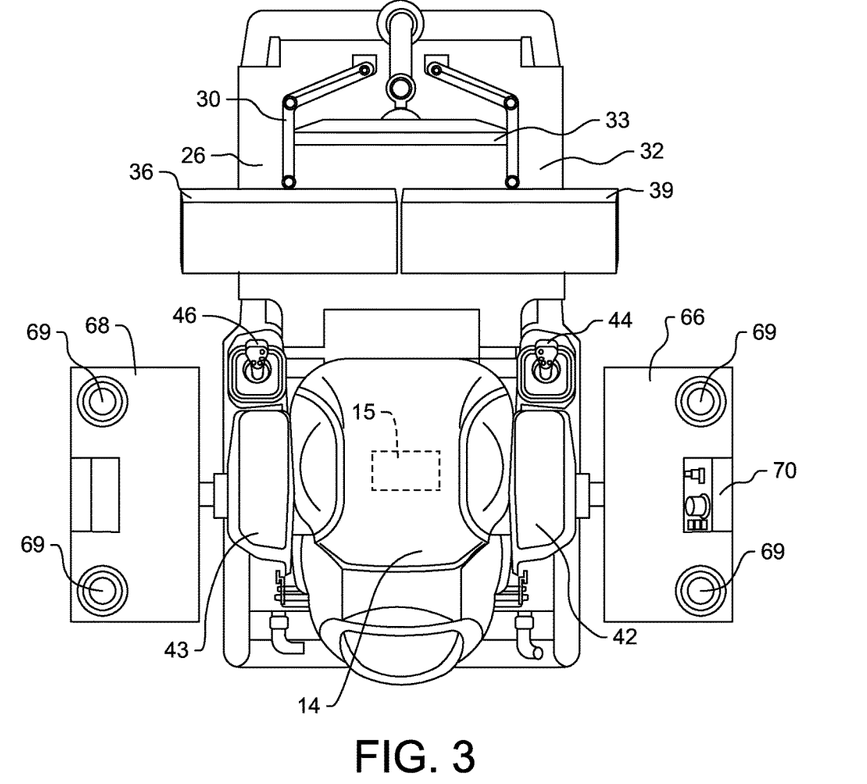
FIG. 3 is a top view of the exemplary remote operator station of FIGS. 1 and 2, in accordance with an embodiment of the present disclosure.

Referring now to FIGS. 1-3, an exemplary remote operator station (ROS) constructed in accordance with the present disclosure is generally referred to by reference numeral 10. In an embodiment, the ROS 10 is configured to remotely operate machines such as, but not limited to, underground mining machines such as underground load-haul-dump loaders and underground mining trucks, backhoe loaders, skid steer loaders, wheel loaders, material loaders, motor graders, track-type tractors, landfill compactors, excavators, and articulated trucks, to name a few, which are employed at a worksite that is remotely located from the ROS 10. Additionally or alternatively, the ROS 10 is configured to provide a simulated environment similar to a real time operation of the machine for operator training.

The ROS 10 includes a frame 12 and a seat 14 slidably coupled to the frame 12. The seat 14 may include a bearing slide 16, or any other sliding mechanisms well known in the industry, for adjusting the seat 14 with respect to the frame 12. The seat 14 is also adjustable to recline at various angles. The frame 12 includes a support section 18, an elevated section 20, and a base 22 disposed between the support section 18 and the elevated section 20. The support section 18 extends upwardly from the forward portion of the base 22 while the rear portion of the base 22 transitions upwardly into the elevated section 20. In this manner, the base 22 can rest on a ground surface, while the elevated section 20 is elevated a distance 24 with respect to the base 22 thereby forming a chair configuration. In an embodiment, the seat 14 is slidably coupled to the elevated section 20 of the frame 12.

The ROS 10 also includes a floor plate 26 disposed on the base 22 of the frame 12. The floor plate 26 may be fastened to the base 22 in any manner well-known in the industry such as with bolts, screws, rivets, and welding. An operator (not shown) can therefore sit in the seat 14 with his/her feet resting comfortably on the floor plate 26. In an embodiment, the seat 14 includes a seat heater 15 (shown in FIG. 3) adjustable to maintain operator comfort.

An upright support mast 28 is detachably coupled to the support section 18. Additionally or alternatively, a first swing arm 30 and/or a second swing arm 32 is detachably coupled to the support section 18. A first interface device 33 is coupled to the upright support mast 28. In an embodiment, the first interface device 33 includes a first interface processor 34 and a first interface memory 35 in communication with the first interface processor 34. In alternative embodiments, the first interface device 33 is a robust, scratch-proof touch-based display interface configured to receive touch-based input from an operator's bare or gloved finger and/or a conductive stylus. The first interface processor 34 may be implemented by one or more microprocessors or other processors well-known in the art. The first interface processor 34 is capable of executing machine-readable instructions to receive, and display on the first interface device 33, real-time situational awareness features of a machine such as, but not limited to, speed, fuel level, engine temperature, and gage levels, camera monitoring information. Such machine-readable instructions may be read into or incorporated into a machine-readable medium, such as the first interface memory 35. In alternative embodiments, hard wired circuitry may be used in place of, or in combination with, machine-readable instructions to implement a method. Machine-readable medium, as used herein, refers to any non-transitory medium or combination of media that participates in providing instructions to the first interface processor 34 or other processors described hereinafter for execution. Such machine-readable medium may comprise all machine-readable media except for a transitory, propagating signal. Common forms of machine-readable media include any medium from which a processor, such as the first interface processor 34, can read.

A second interface device 36 is coupled to the first swing arm 30 such that the second interface device 36 may be moved to a desired position by selectively swinging the first swing arm 30 and locking to the desired position. In an embodiment, the second interface device 36 includes a second interface processor 37 and a second interface memory 38 in communication with the second interface processor 37. In alternative embodiments, the second interface device 36 is a robust, scratch-proof touch-based display interface configured to receive touch-based input from an operator's bare or gloved finger and/or a conductive stylus. The second interface processor 37 may be implemented by one or more microprocessors or other processors well-known in the art. The second interface processor 37 is capable of executing machine-readable instructions to receive touch-based input from the second interface device 36 for generating control signals to remotely control non-movement features and functions of a machine such as, but not limited to, starting/stopping the engine, turning on/off lights, controlling microphone volume, controlling camera recording. The second interface processor 37 is also capable of executing machine-readable instructions to remotely receive machine diagnostics from the machine to display machine health, operator notifications, and other machine information on the second interface device 36. Such machine-readable instructions may be read into or incorporated into a machine-readable medium, such as the second interface memory 38. In alternative embodiments, hard wired circuitry may be used in place of, or in combination with, machine-readable instructions to implement a method.

In alternative embodiments, a third interface device 39 (see FIGS. 1 and 3) is similarly coupled to the second swing arm 32 such that the third interface device 39 may be moved to a desired position by selectively swinging the second swing arm 32 and locking to the desired position. In an embodiment, the third interface device 39 includes a third interface processor 40 and a third interface memory 41 in communication with the third interface processor 40. In alternative embodiments, the third interface device 39 is a robust, scratch-proof touch-based display interface configured to receive touch-based input from an operator's bare or gloved finger and/or a conductive stylus. The third interface processor 40 may be implemented by one or more microprocessors or other processors well-known in the art. The third interface processor 40 is capable of executing machine-readable instructions to receive, and display on the third interface device 39, fleet management information such as, but not limited to, map features illustrating machine positioning. The third interface processor 40 is also capable of executing machine-readable instructions to receive touch-based input from the third interface device 39 for allowing editing capabilities to the fleet management information. Such machine-readable instructions may be read into or incorporated into a machine-readable medium, such as the third interface memory 41. In alternative embodiments, hard wired circuitry may be used in place of, or in combination with, software instructions to implement a method. It should be understood that, in alternative embodiments, the cable connections (not shown) to each of the interface devices 33, 36, 39 may be manually interchangeable such that, as one of multiple exemplary arrangements, the cable connections of the first interface device 33 may be manually interchanged with the cable connections of the second interface device 36 so that the operability associated with the first interface device 33 described above is ascribed to the second interface device 36, and vice versa.

With particular reference to FIG. 3, the seat 14 includes a first armrest 42 and a second armrest 43. In an embodiment, the first and second armrests 42, 43 are one-piece, adjustable armrests. A first input device 44 is integrated with the first armrest 42 and a second input device 46 is integrated with the second armrest 43. The first and second input devices 44, 46 may be any input devices well-known in the industry such as, but not limited to, joysticks, levers, and push-buttons.

Referring back to FIGS. 1 and 2, the ROS 10 further includes an enclosure 48 disposed beneath the elevated section 20 of the frame 12. The enclosure 48 houses an electronic control module 50. The enclosure 48 may include a cover 52 hinged or otherwise removably attached thereto to provide access to the electronic control module 50 and other electronic components. In an embodiment, the cover 52 may be locked to the enclosure with turnlock fasteners 54 such as Dzus™ fasteners although other types of secure attachments are possible. The enclosure 48 further includes a boss 55 disposed on the exterior thereof for grounding the electronic control module 50 and other electronic components to earth ground.

Figure 4:
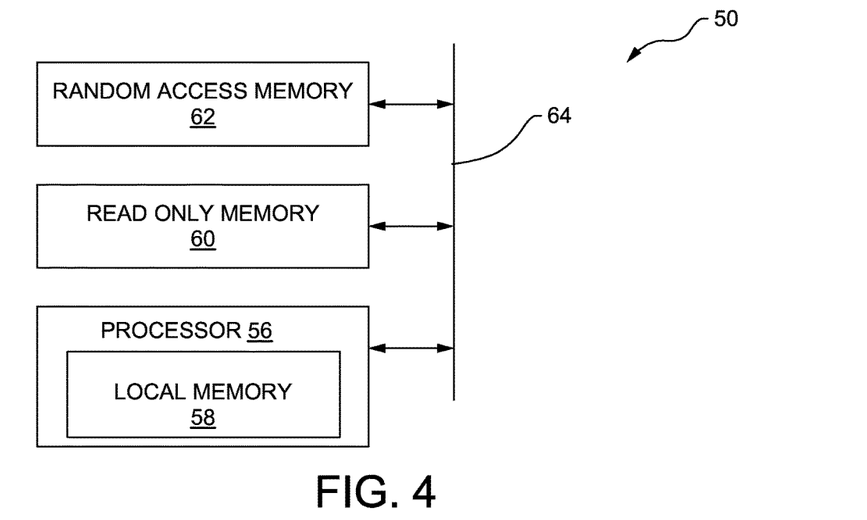
FIG. 4 is a block diagram illustrating components of an exemplary electronic control module, in accordance with an embodiment of the present disclosure.

Referring to FIG. 4, the electronic control module 50 includes a control processor 56, which may be implemented by one or more microprocessors or other processors well-known in the art. The control processor 56 includes a local memory 58 and is in communication with a read-only memory 60 and a random access memory 62 via a bus 64. The random access memory 62 may be implemented by Synchronous Dynamic Random Access Memory (SDRAM), Dynamic Random Access Memory (DRAM), RAMBUS Dynamic Random Access memory (RDRAM) and/or any other type of random access memory device. The read-only memory 60 may be implemented by a hard drive, flash memory and/or any other desired type of memory device. The control processor 56 is capable of executing machine-readable instructions to receive input signals from the first and second input devices 44, 46 for generating control signals to remotely operate a machine such as, but not limited to, machine movement, implement movement of the machine, and implement-related functions. Such machine-readable instructions may be read into or incorporated into a machine-readable medium such as, for example, the local memory 58. In alternative embodiments, hard wired circuitry may be used in place of, or in combination with, machine-readable instructions to implement a method.

Figure 5:
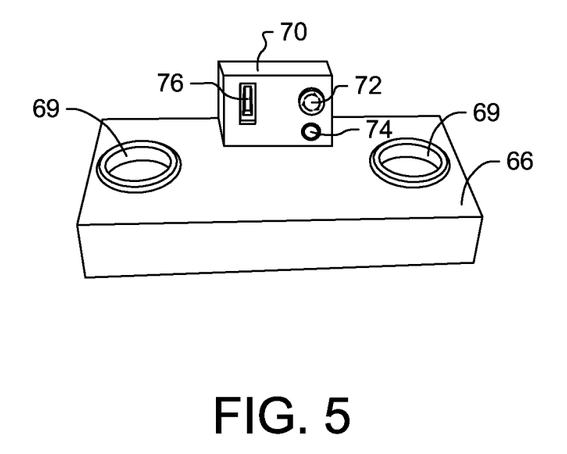
FIG. 5 is a perspective view of an exemplary console, in accordance with an embodiment of the present disclosure.

As illustrated in FIGS. 1 and 3, the ROS 10 includes a first console plate 66 detachably coupled to the elevated section 20 of the frame 12. It is to be understood that the first console plate 66 can be detachably coupled to either side of the elevated section 20 of the frame 12. Additionally or alternatively, the ROS 10 further includes a second console plate 68 detachably coupled to the opposite side of the elevated section 20 of the frame 12. In some embodiments, at least one cup holder 69 is disposed on either and/or both the first console plate 66 and the second console plate 68. In other embodiments, a console 70 is integrated with the first console plate 66. In an alternative embodiment, the console 70 is integrated with the second console plate 68 instead. With reference to FIG. 5, the console 70 operatively houses an area isolation system (AIS) shutdown switch 72, an AIS reset switch 74, and a fire suppression switch 76. The AIS shutdown switch 72 is configured to provide a safety feature at the worksite where the machine is employed and is operatively associated with an AIS shutdown programmable logic controller 78 (illustrated in FIG. 6) disposed in the enclosure 48. The AIS reset switch 74 is configured to reset the safety feature at the worksite back to operating conditions and is operatively associated with an AIS control programmable logic controller 80 (illustrated in FIG. 6) disposed in the enclosure 48. The fire suppression switch 76 is configured to provide the worksite with a safe guard against possible fires and is operatively associated with the electronic control module 50.

Figure 6:
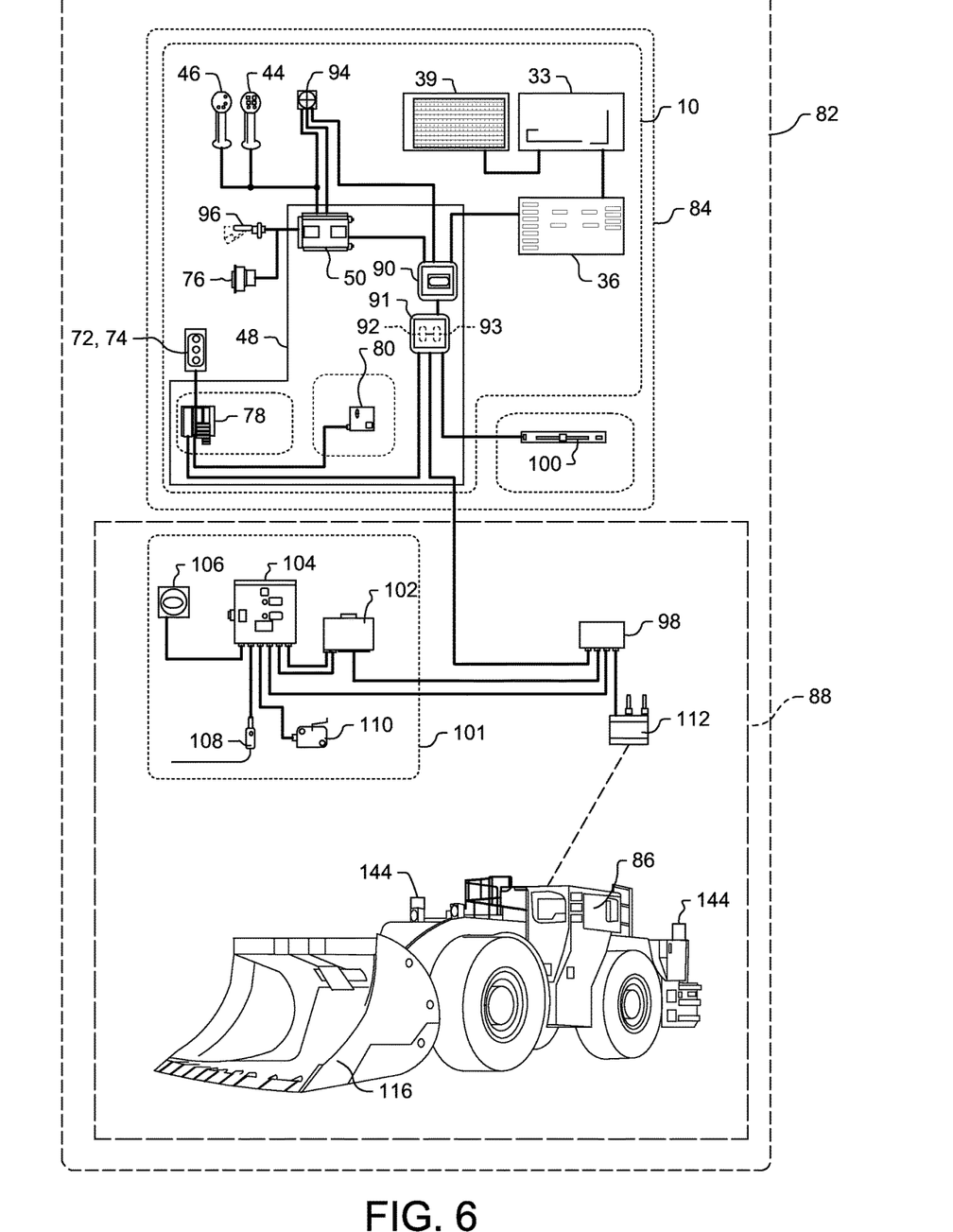
FIG. 6 is schematic diagram of an exemplary system architecture of the remote operator station of FIGS. 1 and 2, in accordance with the embodiment of the present disclosure.

As illustrated in FIG. 6, in an embodiment, the ROS 10 is implemented in system 82. The ROS 10 is located at an operator center 84 for remotely operating a machine 86 employed at a worksite 88. Although the machine 86 is exemplarily illustrated as an underground load-haul-dump loader, it is to be understood that the machine 86 may be, for example, any machine well known in the earth-moving, construction, mining, and agricultural industries. The enclosure 48 of the ROS 10 further houses an Ethernet switch 90 and a router 91, including a router processor 92 and a router memory 93, in communication with the Ethernet switch 90. In an embodiment, the router 91 is configured to receive and transmit signals between the various components of the system 82. The Ethernet switch 90 is also in communication with the electronic control module 50, the interface devices 33, 36, 39, and a service port 94 that is also in communication with the electronic control module 50. The electronic control module 50 is also in communication with the first and second input devices 44, 46, the fire suppression switch 76, and a sensor 96 for detecting an operator at the ROS 10. In an embodiment, the sensor 96 is disposed integrally with the seat 14 of the ROS 10 and is configured to detect when an operator has moved out of the seat 14 such that, upon detection, the ROS 10 is configured to automatically lock down the first and second input devices 44, 46 and bring the machine 86 to a safe state. As non-limiting examples, the sensor 96 can be a pressure sensor, an analog-voltage sensor, and any other well-known sensors in the art.

In some embodiments, the enclosure 48 of the ROS 10 can house multiple and/or single electronic control modules, such as electronic control module 50, to provide managed Ethernet connectivity over a local area network (LAN). The router 91 is in communication with a network switch 98 via a wide area network (WAN) or any other type of network well known in the art. Additionally or alternatively, the router 91 is in further communication with an external server 100 which is located at the operator center 84 as a separate unit from the ROS 10. The external server 100 is configured to store information such as, but not limited, operator login information, maps, configurations, and machine operation logs, and to allow the ROS 10 and machine access to such stored information.

In an alternative embodiment, the ROS 10 includes the AIS shutdown switch 72 and the AIS reset switch 74, both of which are in communication with the router 91 via the AIS shutdown programmable logic controller 78 and the AIS control programmable logic controller 80, respectively. In this manner, the router 91 is also in communication with an area isolation system 101 via the network switch 98 to transmit control signals from the AIS shutdown programmable logic controller 78 and the AIS control programmable logic controller 80, which were initiated by the AIS shutdown switch 72 and the AIS reset switch 74, respectively. The area isolation system 101 is located at the worksite 88 off-board of the machine 86 and may include an at least one machine shutdown module 102 in communication with an at least one barrier control panel 104, both of which are in communication with the network switch 98. The at least one barrier control panel 104 is further in communication with a strobe light 106, a machine barrier switch 108, and a personal barrier switch 110.

The network switch 98 is further in communication with an Ethernet radio 112 configured to wirelessly transmit operating signals initiated from the ROS 10 to the machine 86, and to wirelessly receive real-time machine characteristics from the machine 86 such as, but not limited to, speed, engine temperature, and position information, for transmission to the ROS 10. For example, in an embodiment, the electronic control module 50 is configured to receive and process input signals from the first and second input devices 44, 46 to communicate the processed input signals to the machine 86 for a desired response thereof; the first interface device 33 is configured to remotely receive and display real-time situational awareness features of the machine 86; the second interface device 36 is configured to receive touch-based input for remotely controlling non-movement features and functions of the machine 86 and is further configured to remotely receive and display machine diagnostics from the machine 86; and the third interface device 39 is configured to receive and display fleet management information, as well as receive touch-based input to edit the fleet management information.

Figure 7:
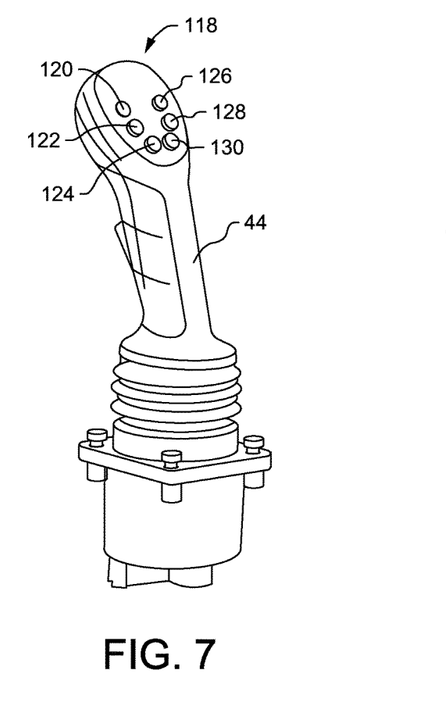
FIG. 7 is a perspective view of an exemplary joystick, in accordance with an embodiment of the present disclosure.
Figure 8:
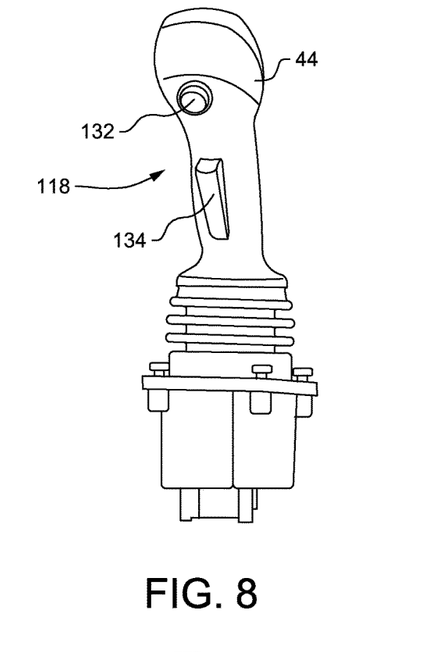
FIG. 8 is another perspective view of the exemplary joystick of FIG. 7, in accordance with an embodiment of the present disclosure.

As a non-limiting example, the first input device 44 is a first joystick, as illustrated in FIGS. 7 and 8, and is configured to transmit input signals to the electronic control module 50 for processing and communicating to the machine 86, via Ethernet radio 112, for specific operations related to an implement 116 of the machine 86 such as, but not limited to, a bucket. For example, movement of the first input device 44 controls operation of the implement 116 such that forward movement lowers the implement 116, backward movement raises the implement 116, leftward movement tilts the implement 116 back, and rightward movement controls the implement 116 to dump. Moreover, the first input device 44 includes a plurality of implement control buttons 118, which, when engaged, control operations related to the implement 116. For example, the plurality of implement control buttons 118 includes a first operator-facing button 120 for initiating a next machine operation, a second operator-facing button 122 for initiating a guidance mode on/off operation, a third operator-facing button 124 for initiating an auto load operation, a fourth operator-facing button 126 for initiating a next goal operation, a fifth operator-facing button 128 for initiating an autopilot activation operation after the autopilot operation has been enabled via a touch-based input on the second interface device 36, and a sixth operator-facing button 130 for initiating an ejector bucket operation. Further, the plurality of implement control buttons 118 includes a forward-facing button 132 for initiating a bucket counter increment operation and a forward-facing trigger button 134 for initiating an operation to raise rotations per minute.

Figure 9:
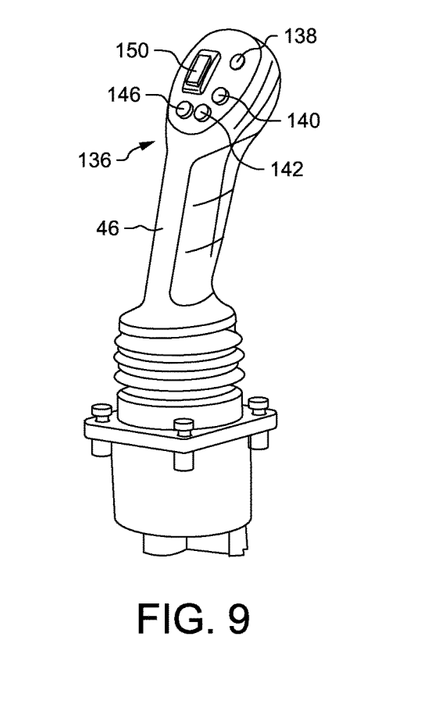
FIG. 9 is a perspective view of another exemplary joystick, in accordance with an embodiment of the present disclosure.
Figure 10:
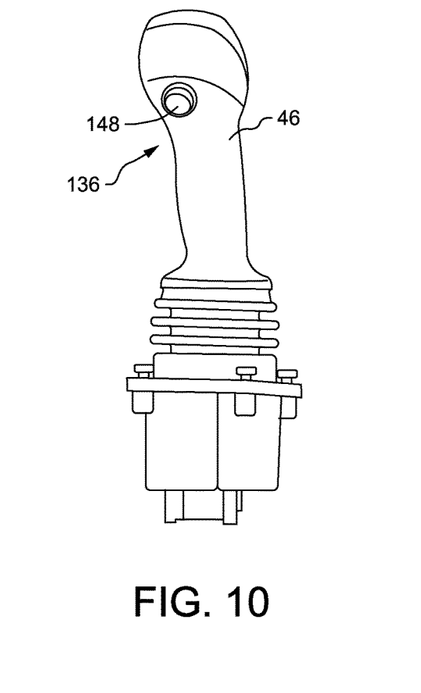
FIG. 10 is another perspective view of the exemplary joystick of FIG. 9, in accordance with an embodiment of the present disclosure.

As a non-limiting example, the second input device 46 is a second joystick, as illustrated in FIGS. 9 and 10, and is configured to transmit input signals to the electronic control module 50 for processing and communicating to the machine 86, via Ethernet radio 112, for specific operations related to controlling motion thereof. For example, movement of the second input device 46 controls movement of the machine 86 such that forward movement propels the machine 86 in a forward direction, backward movement propels the machine 86 in a reverse direction, leftward movement turns the machine 86 left, and rightward movement turns the machine 86 right. Moreover, the second input device 46 includes a plurality of machine control buttons 136, which, when engaged, control operations related to movement of the machine 86. For example, the plurality of machine control buttons 136 includes a first machine button 138 for initiating an engine stop operation, a second machine button 140 for initiating a straightening operation, a third machine button 142 for initiating camera view switching on a main screen view on the first interface device 33 to switch camera views between each camera of a plurality of cameras 144 of the machine 86, a fourth machine button 146 for initiating momentary view switching on the first interface device 33 between a forward-facing camera and a rear-facing camera of the plurality of cameras 144, a fifth machine button 148 for sounding a horn, and a rocker switch 150 for initiating transmission shifting.

In an embodiment, each camera of the plurality of cameras 144 is coupled to the machine 86 and includes at least one forward-facing camera and at least one rear-facing camera. The plurality of cameras 144 are configured to communicate wirelessly with the first interface device 33 of the ROS 10 for displaying real-time monitoring information thereon.

Figure 11:
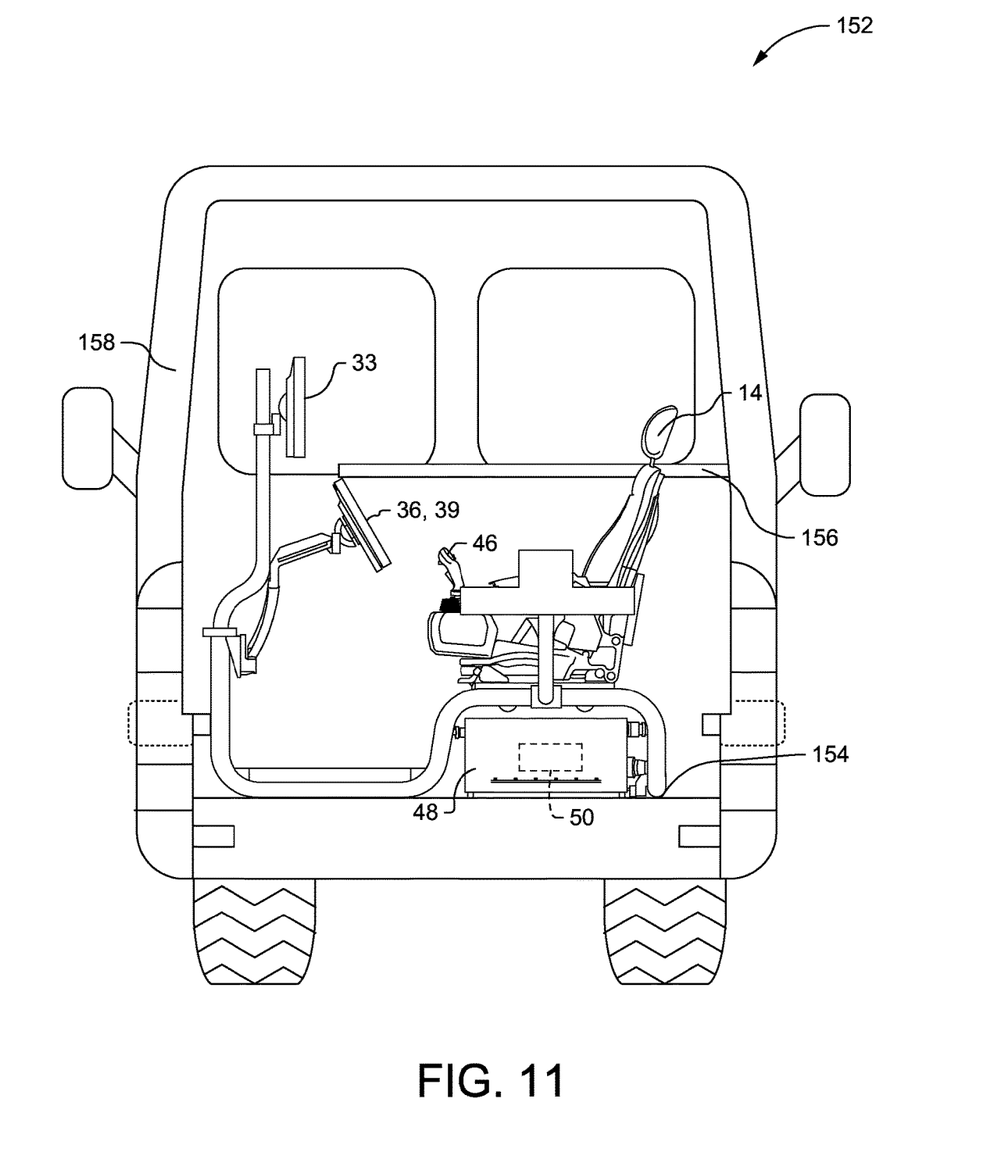
FIG. 11 is a rear view of an alternative embodiment illustrating the remote operator station in a mobile environment, in accordance with the present disclosure.

Referring to FIG. 11, in an alternative embodiment, the ROS 10 is shown in a mobile environment 152 such as, but not limited to, a van or other mobile vehicle. In such embodiments, the frame 12 of the ROS 10 is releasably coupled to floor 154 of the mobile environment 152. In other embodiments, the enclosure 48 housing the electronic control module 50 is, as a non-limiting example, coupled to a shelving unit 156 of the mobile environment 152 instead of being disposed underneath the elevated section 20 of the frame 12. Moreover, in other embodiments, instead of being coupled to the frame 12, any of the interface devices 33, 36, 39 may be pivotally coupled to a wall 158 of the mobile environment 152. With the ROS 10 conveniently arranged in the mobile environment 152, an operator can drive the mobile environment 152 to any desired location, park, and remotely operate a machine via the ROS 10 as discussed above.

INDUSTRIAL APPLICABILITY

In general, the present disclosure may find applicability in any number of industrial applications such as, but not limited to, mining, earth-moving, construction, and agricultural industries. By utilizing the apparatus and systems disclosed herein, the ROS 10 is configured to remotely operate machines such as, but not limited to, underground mining machines such as underground load-haul-dump loaders and underground mining trucks, backhoe loaders, skid steer loaders, wheel loaders, material loaders, motor graders, track-type tractors, landfill compactors, excavators, and articulated trucks, to name a few, which are employed at a worksite that is remotely located from the ROS 10. More specifically, the ROS 10 provides a turnkey unit with standardized components integrated thereinto. As such, the ROS 10 may minimize the variability in components found in customized remote operator stations thereby allowing for improved serviceability and scalability, increased operator experience, and greater efficiency in maintenance and initial installation at customer sites.

Furthermore, the teachings of this disclosure can be employed to provide a suitable ROS 10 that suits both office environments and mobile environments. As a non-limiting example, the ROS 10 is arranged in an office environment such that the interface devices 33, 36, 39 may be discretely arranged with respect to the frame 12 of the ROS 10 as the support section 18 of the frame 12, without the support mast 28 and first and second swing arms 30, 32, is positioned underneath a desk at the operator center 84 and the interface devices are coupled to a wall positioned in front of the ROS 10. As another non-limiting example, the ROS 10 is arranged in a mobile environment 152 for convenient transportation to any desired location such that the ROS 10 can remotely operate the machine 86 therefrom.

For example, as part of system 82, the ROS 10 is installed at the operator center 84 for remotely operating the machine 86, which is remotely employed at the worksite 88. The first and second input devices 44, 46 of the ROS 10 may be engaged, individually or in combination, to operate various functions of the machine 86 such as, but not limited to, movement of the implement 116 and movement of the machine 86 itself. Moreover, the interface devices 33, 36, 39 of the ROS 10 may display various real-time monitoring information remotely received from the plurality of cameras 144 and the machine 86 itself. Further, the second and third interface device 36, 39 of the ROS 10 may be engaged via touching thereof to operate various functions and features of the machine 86 excluding movement of the machine 86 or movement of the implement 116 of the machine 86.

What is claimed is:

1. A remote operator station, comprising:
    a frame including a support section, an elevated section, and a base, the base disposed between the support section and the elevated section;
    a seat coupled to the elevated section, the seat including a first armrest and a second armrest;
    a first input device disposed integrally with the first armrest;
    a second input device disposed integrally with the second armrest;
    an upright support mast detachably coupled to the support section;
    a first interface device coupled to the upright support mast, the first interface device including a first interface processor;
    a first swing arm detachably coupled to the support section;
    a second interface device coupled to the first swing arm, the second interface device including a second interface processor;
    an enclosure disposed underneath the elevated section;
    a router including a router processor, the router housed in the enclosure and in communication with the first interface device and the second interface device; and
    an electronic control module in communication with, at least, the first input device, the second input device, and the router, the electronic control module housed in the enclosure and configured to:
        receive input signals from one of the first input device and the second input device;
        process the input signals; and
        communicate wirelessly processed input signals to a machine for remote operation thereof.

2. The remote operator station of claim 1, further including a second swing arm detachably coupled to the support section and a third interface device, in communication with the electronic control module, coupled to the second swing arm, wherein the third interface device includes a third interface processor, wherein the first interface device, via manually interchangeable connections thereto, is configured to display one of real-time situational awareness features of the machine, machine health information, and fleet management information, and wherein the second interface device, via manually interchangeable connections thereto, is configured to display a different one of real-time situational awareness features of the machine, machine health information, and fleet management information.

3. The remote operator station of claim 1, wherein the seat is slidably coupled to the elevated section via a bearing slide.

4. The remote operator station of claim 1, further including a sensor disposed on the seat to detect whether an operator has moved out of the seat.

5. The remote operator station of claim 1, wherein the first and second armrests are one-piece, adjustable armrests.

6. The remote operator station of claim 1, wherein the enclosure includes a cover hingedly attached thereto, the cover including turnlock fasteners to lock the cover to the enclosure.

7. The remote operator station of claim 1, wherein the electronic control module is configured to provide a simulated environment similar to a real time operation of the machine.

8. The remote operator station of claim 1, wherein the first input device and the second input device are joysticks.

9. The remote operator station of claim 1, further including a console plate coupled to the frame and a console disposed on the console plate, the console operatively housing an area isolation system shutdown switch, an area isolation system reset switch, and a fire suppression switch.

10. The remote operator station of claim 9, wherein the area isolation system shutdown switch is in communication with an area isolation system shutdown programmable logic controller and the area isolation system reset switch is in communication with an area isolation system control programmable logic controller.

11. The remote operator station of claim 10, wherein the area isolation system shutdown programmable logic controller and the area isolation system control programmable logic controller are in wireless communication with a remotely located area isolation system.

12. The remote operator station of claim 11, wherein the remotely located area isolation system includes a barrier control panel in communication with a strobe light, a machine barrier switch, and a personal barrier switch.

13. A remote operator station, comprising:
    a seat;
    a first and a second input device disposed on the seat;

an interface device discretely arranged with respect to the remote operator station, the interface device including an interface processor in communication with a machine, the interface processor configured to remotely control non-movement features and functions of the machine; and an electronic control module in communication with, at least, the first input device and the second input device, the electronic control module configured to:
  receive input signals from one of the first input device and the second input device;
  process the input signals; and
  communicate wirelessly processed input signals to the machine for remote operation thereof.

14. The remote operator station of claim 13, wherein the seat is disposed in a mobile environment.

15. The remote operator station of claim 13, wherein the seat is slidably coupled to a frame and the interface device is coupled to a wall positioned in front of the remote operator station wherein a support section of the frame is configured for positioning underneath a desk in front of the remote operator station.

16. A system for remotely operating a machine, comprising:
  the machine including an implement and a plurality of cameras; and
  a remote operator station remotely located from the machine, the remote operator station including:
    a frame;
    a seat slidably coupled to the frame, the seat including a first armrest and a second armrest;
    a first input device disposed integrally with the first armrest;
    a second input device disposed integrally with the second armrest;
    a first interface device coupled to the frame, the first interface device including a first interface processor in communication with the machine and the plurality of cameras, the first interface processor configured to receive and display real-time situational awareness features of the machine;
    a second interface device coupled to the frame, the second interface device including a second interface processor in communication with the machine, the second interface processor configured to remotely control non-movement features and functions of the machine; and
    an electronic control module in communication with, at least, the first input device, second input device, and the machine, the electronic control module configured to:
      receive input signals from one of the first input device and the second input device;
      process the input signals; and
      communicate wirelessly processed signals to the machine for remote operation of the machine and the implement.

17. The system of claim 16, wherein the plurality of cameras includes a forward-facing camera and a rear-facing camera.

18. A system of claim 16, wherein the first input device is configured to control operations related to the implement.

19. The system of claim 16, wherein the second input device is configured to control operations related to controlling the machine.

20. The system of claim 16, wherein the electronic control module is configured to provide a simulated environment similar to a real time operation of the machine.

* * * * *